(12) United States Patent
Fujita

(10) Patent No.: US 7,419,735 B2
(45) Date of Patent: Sep. 2, 2008

(54) FUEL CELL SYSTEM, METHOD OF CONTROLLING THE SAME, AND VEHICLE MOUNTED WITH THE SAME

(75) Inventor: Nobuo Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 139 days.

(21) Appl. No.: 10/233,585

(22) Filed: Sep. 4, 2002

(65) Prior Publication Data

US 2003/0049501 A1 Mar. 13, 2003

(30) Foreign Application Priority Data

Sep. 7, 2001 (JP) ............... 2001-271569

(51) Int. Cl.
*H01M 8/04* (2006.01)
*H01M 8/18* (2006.01)

(52) U.S. Cl. ............... 429/24; 429/20; 429/26

(58) Field of Classification Search ............... 429/19, 429/20, 22, 26, 24
See application file for complete search history.

(56) References Cited

U.S. PATENT DOCUMENTS

| | | | |
|---|---|---|---|
| 6,651,701 B2 | 11/2003 | Kuriiwa et al. | |
| 6,733,741 B2 * | 5/2004 | Nakamura | 423/658.3 |
| 6,800,390 B2 | 10/2004 | Kashiwagi | |
| 6,815,104 B2 | 11/2004 | Uehara et al. | |
| 6,884,532 B2 | 4/2005 | Monzel | |
| 6,964,822 B2 | 11/2005 | Kobayashi et al. | |
| 7,005,204 B2 | 2/2006 | Aoyagi et al. | |

FOREIGN PATENT DOCUMENTS

| | | |
|---|---|---|
| EP | 0 817 298 A | 1/1998 |
| EP | 0 995 944 A | 4/2000 |
| EP | 1 176 219 A | 1/2002 |
| JP | 61-069993 | 4/1986 |
| JP | 05047400 | 2/1993 |
| JP | 07094202 | 4/1995 |
| JP | 2001-213605 | 8/2001 |

* cited by examiner

*Primary Examiner*—Patrick Ryan
*Assistant Examiner*—Thomas H. Parsons
(74) *Attorney, Agent, or Firm*—Oblon, Spivak, McClelland, Maier & Neustadt, P.C.

(57) ABSTRACT

A fuel cell can be heated, upon starting thereof, by supplying hydrogen gas from a hydrogen tank to a hydrogen adsorbing alloy tank so as to be adsorbed therein. The hydrogen adsorbing alloy tank adsorbs the hydrogen gas with generation of heat. The heat thus generated is transmitted to the fuel cell by cooling water circulating between the hydrogen adsorbing alloy tank and the fuel cell, whereby the temperature increases.

13 Claims, 4 Drawing Sheets

FUEL CELL SYSTEM, METHOD OF CONTROLLING THE SAME, AND VEHICLE MOUNTED WITH THE SAME

INCORPORATION BY REFERENCE

The disclosure of Japanese Patent Application No. 2001-271569 filed on Sep. 7, 2001 including the specification, drawings and abstract is incorporated herein by reference in its entirety.

BACKGROUND OF THE INVENTION

1. Field of the Invention

The invention generally relates to a fuel cell system including a hydrogen tank for supplying hydrogen gas and a fuel cell for receiving the hydrogen gas and generating electric power, a method of controlling the system, and a vehicle mounted with the system. More particularly, the invention relates to a fuel cell system capable of controlling the temperature of a fuel cell, a method of controlling the system, and a vehicle mounted with the system.

2. Description of the Related Art

When a vehicle with a fuel cell system including both a high-pressure hydrogen tank and a fuel cell is used in, e.g., a cold region in winter, the ambient temperature is so low (e.g., below 0° C.) that the fuel cell (e.g., electrolyte membranes therein) may possibly be in a frozen state before the fuel cell system is started. The fuel cell cannot be operated in such a state. Accordingly, when the fuel cell system is to be started, the fuel cell can be operated only after thawing the fuel cell, i.e., after heating the fuel cell to normal temperature (e.g., 0° C. or higher).

In such a case, the related art employs a method of heating the fuel cell or the cooling water circulating therein by using an electric heater or a combustion heater.

The related art also employs the same method in the case where the temperature of the fuel cell does not rise to a proper temperature even after the fuel cell has begun operation.

For example, the method using the electric heater requires a large-capacity battery to be mounted on the vehicle in order to supply electric power to the electric heater.

In the method using the combustion heater, hydrogen gas (i.e., fuel to be supplied to the fuel cell) is supplied to the combustion heater and burnt therein. Accordingly, the fuel (hydrogen gas) thus supplied to the combustion heater is used only for combustion, not at all for generation of electric power in the fuel cell. This is a loss of energy from the standpoint of power generation. Note that even the method using the electric heater is subjected to the same problem if electric power generated by the fuel cell is accumulated in the battery for use in heating the electric heater.

It is also possible to entirely wrap the fuel cell in a heat insulating material to keep the fuel cell warm. In this method, however, the fuel cell can be kept at a proper temperature for a certain time after operation of the fuel cell is terminated, but the temperature of the fuel cell falls to the ambient temperature over time. Therefore, the fuel cell must still be heated to a proper temperature upon starting of the fuel cell system after a long interval of non-use.

SUMMARY OF THE INVENTION

It is therefore an object of the invention to provide a fuel cell system that solves the problems of the related art described above, and is capable of controlling a fuel cell to a desired temperature and efficiently using energy without requiring a large-capacity battery, a method of controlling the system, and a vehicle mounted with the system.

In order to achieve at least a part of the above object, a fuel cell system according to a first aspect of the invention includes a hydrogen tank that supplies hydrogen gas, a fuel cell that receives the hydrogen gas and generates electric power, a hydrogen adsorbing alloy tank that receives and stores the hydrogen gas, and a heat exchange unit that causes heat exchange between the fuel cell and the hydrogen adsorbing alloy tank. The hydrogen adsorbing alloy tank has a hydrogen adsorbing alloy, and is capable of receiving the hydrogen gas from the hydrogen tank, adsorbing the received hydrogen gas in the hydrogen adsorbing alloy, and discharging the hydrogen gas from the hydrogen adsorbing alloy to the fuel cell. The heat exchange unit circulates a heat exchange medium to the fuel cell and the hydrogen adsorbing alloy tank and causes heat exchange at least between the fuel cell and the hydrogen adsorbing alloy tank.

When a temperature of the fuel cell is equal to or lower than a first reference temperature, the fuel cell system heats the fuel cell by supplying the hydrogen gas from the hydrogen tank to the hydrogen adsorbing alloy tank so that the hydrogen gas is adsorbed in the hydrogen adsorbing alloy tank with generation of heat, and transmitting the generated heat to the fuel cell by the heat exchange medium.

According to the fuel cell system of the first aspect of the invention, the fuel cell is heated in the following manner when the temperature of the fuel cell is equal to or lower than the first reference temperature: the hydrogen gas is supplied from the hydrogen tank to the hydrogen adsorbing alloy tank so as to be adsorbed therein. The hydrogen adsorbing alloy causes an exothermic reaction when adsorbing the hydrogen gas. As a result, heat is generated in the hydrogen adsorbing alloy tank. The heat thus generated is transmitted to the fuel cell by circulating the heat exchange medium of the heat exchange unit in order to raise the temperature of the fuel cell.

According to the fuel cell system of the first aspect of the invention, the fuel cell can be heated to a desired temperature when the temperature of the fuel cell is equal to or lower than the first reference temperature. Therefore, even when the fuel cell system is used in, e.g., winter and the fuel cell is frozen due to an extremely low ambient temperature before the fuel cell system is started, the fuel cell can be heated to a normal temperature upon starting of the fuel cell system. In other words, the fuel cell can be operated after being heated enough to be thawed.

Moreover, the fuel cell is heated with the heat generated when the hydrogen gas is adsorbed in the hydrogen adsorbing alloy tank. This eliminates the need for an electric heater and a combustion heater as used conventionally, and thus eliminates the need for a large-capacity battery.

A fuel cell system according to a second aspect of the invention includes a hydrogen tank that supplies hydrogen gas, a fuel cell that receives the hydrogen gas and generates electric power, a hydrogen adsorbing alloy tank that receives and stores the hydrogen gas, and a heat exchange unit that causes heat exchange between the fuel cell and the hydrogen adsorbing alloy tank. The hydrogen adsorbing alloy tank has a hydrogen adsorbing alloy, and is capable of receiving the hydrogen gas from the hydrogen tank, adsorbing the received hydrogen gas in the hydrogen adsorbing alloy, and discharging the hydrogen gas from the hydrogen adsorbing alloy to the fuel cell. The heat exchange unit circulates a heat exchange medium to the fuel cell and the hydrogen adsorbing alloy tank and causes heat exchange at least between the fuel cell and the hydrogen adsorbing alloy tank.

When a temperature of the fuel cell is higher than the first reference temperature and equal to or lower than a second reference temperature, the fuel cell system allows the fuel cell to use the hydrogen gas for power generation by supplying the hydrogen gas from the hydrogen tank to the fuel cell, and heats the fuel cell by supplying the hydrogen gas from the hydrogen tank to the hydrogen adsorbing alloy tank so that the hydrogen gas is adsorbed in the hydrogen adsorbing alloy tank with generation of heat, and transmitting the generated heat to the fuel cell by the heat exchange medium.

According to the fuel cell system of the second aspect of the invention, the fuel cell is heated in the following manner when the temperature of the fuel cell is higher than the first reference temperature and equal to or lower than the second reference temperature: the hydrogen gas is supplied from the hydrogen tank to both the fuel cell and the hydrogen adsorbing alloy tank. The fuel cell uses the received hydrogen gas for power generation. The hydrogen adsorbing alloy tank adsorbs the received hydrogen gas with generation of heat. The heat thus generated is transmitted from the hydrogen adsorbing alloy tank to the fuel cell by the heat exchange medium in order to raise the temperature of the fuel cell.

According to the second aspect of the invention, when the temperature of the fuel cell is higher than the first reference temperature and equal to or lower than the second reference temperature, the fuel cell can be heated to a desired temperature during operation of the fuel cell. Therefore, for example, when the fuel cell is not frozen but the temperature thereof is not high enough, the fuel cell can be rapidly heated with the heat generated by the fuel cell itself and the heat transmitted from the hydrogen adsorbing alloy tank.

A fuel cell system according to a third aspect of the invention includes a hydrogen tank that supplies hydrogen gas, a fuel cell that receives the hydrogen gas and generates electric power, a hydrogen adsorbing alloy tank that receives and stores the hydrogen gas, and a heat exchange unit that causes heat exchange between the fuel cell and the hydrogen adsorbing alloy tank. The hydrogen adsorbing alloy tank has a hydrogen adsorbing alloy, and is capable of receiving the hydrogen gas from the hydrogen tank, adsorbing the received hydrogen gas in the hydrogen adsorbing alloy, and discharging the hydrogen gas from the hydrogen adsorbing alloy to the fuel cell. The heat exchange unit circulates a heat exchange medium to the fuel cell and the hydrogen adsorbing alloy tank and causes heat exchange at least between the fuel cell and the hydrogen adsorbing alloy tank.

When the temperature of the fuel cell is higher than a fourth reference temperature, the fuel cell system allows the fuel cell to use the hydrogen gas for power generation by transmitting heat generated by the fuel cell to the hydrogen adsorbing alloy tank by the heat exchange medium so that the hydrogen adsorbing alloy tank discharges the hydrogen gas while absorbing the transmitted heat, and supplying the discharged hydrogen gas to the fuel cell.

According to the fuel cell system of the third aspect of the invention, the fuel cell system allows the fuel cell to use the hydrogen gas for power generation in the following manner when the temperature of the fuel cell is higher than the fourth reference temperature: heat generated by the fuel cell is transmitted to the hydrogen adsorbing alloy tank by circulating the heat exchange medium. As a result, the hydrogen adsorbing alloy tank discharges the hydrogen gas while absorbing the transmitted heat. The discharged hydrogen gas is then supplied to the fuel cell.

According to the fuel cell system of the third aspect of the invention, when the temperature of the fuel cell is higher than the fourth reference temperature, the fuel cell can be cooled to a desired temperature by using the hydrogen adsorbing alloy tank having the hydrogen gas adsorbed therein. Therefore, the fuel cell can be retained at a steady temperature even when the fuel cell system is used at a high ambient temperature as in, e.g., summer.

It should be noted that the invention is not limited to the forms such as the fuel cell system described above. The invention can be implemented as a method of controlling such a system, and a vehicle mounted with such a system.

BRIEF DESCRIPTION OF THE DRAWINGS

The foregoing and further objects, features and advantages of the invention will become apparent from the following description of preferred embodiments with reference to the accompanying drawings, wherein.

DETAILED DESCRIPTION OF THE PREFERRED EMBODIMENTS

Figure 1:
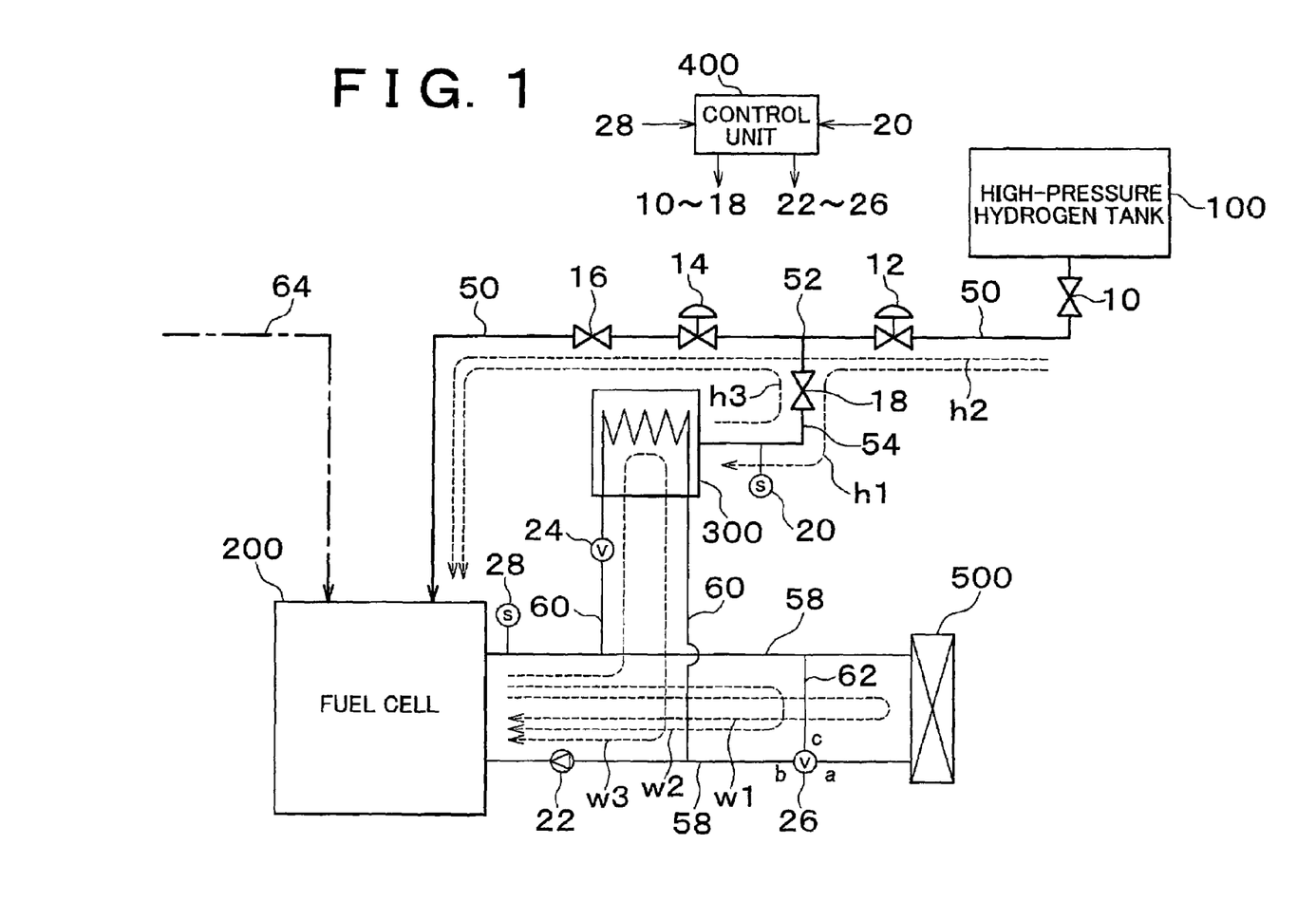
FIG. 1 shows the structure of a fuel cell system according to an embodiment of the invention.

Hereinafter, embodiments of the invention will be described in the following order:
Structure of Embodiment;
Heating Operation and Normal Operation;
Regenerating Operation;
Cooling Operation; and
Modifications.
Structure of Embodiment FIG. 1 shows the structure of a fuel cell system according to an embodiment of the invention.

The fuel cell system of this embodiment is intended to be mounted on a vehicle such as an automobile, and mainly includes a high-pressure hydrogen tank 100 for supplying hydrogen gas, a fuel cell 200 for receiving hydrogen gas and generating electric power, and a hydrogen adsorbing alloy tank 300 for storing and discharging hydrogen gas.

The high-pressure hydrogen tank 100 is charged with high-pressure hydrogen gas. A shut valve 10 is mounted at the bottom of the high-pressure hydrogen tank 100. By opening the shut valve 10, hydrogen gas having a pressure of about 20 to 35 MPa is discharged from the high-pressure hydrogen tank 100.

The fuel cell 200 receives hydrogen gas containing hydrogen and oxidizing gas containing oxygen (e.g., air), and generates electric power by causing an electrochemical reaction at a hydrogen electrode and an oxygen electrode according to the reaction formula described below.

More specifically, when the hydrogen gas and the oxidizing gas are respectively supplied to the hydrogen electrode and the oxygen electrode, the reaction given by formula (1) occurs at the hydrogen electrode, and the reaction given by formula (2) occurs at the oxygen electrode. Therefore, the overall reaction in the fuel cell 200 is given by formula (3).

$$H_2 \rightarrow 2H^+ + 2e^- \tag{1}$$

$$2H^+ + 2e^- + (\tfrac{1}{2})O_2 \rightarrow H_2O \tag{2}$$

$$H_2 + (\tfrac{1}{2})O_2 \rightarrow H_2O \tag{3}$$

When such a fuel cell 200 is used as a power source of the vehicle, an electric motor (not shown) is driven by the electric power generated by the fuel cell 200. The torque thus generated by the electric motor is transmitted to an axle (not shown) to obtain the motive force of the vehicle.

The fuel cell 200 has a laminated structure of a plurality of single cells. Each single cell is formed by an electrolyte membrane, two diffusion electrodes interposing the electrolyte membrane therebetween (i.e., a hydrogen electrode and an oxygen electrode), and two separators interposing the diffusion electrodes therebetween (all of which are not shown in the figure). Each separator has a corrugated surface on both sides, which forms a gas passage within each single cell, together with the oxygen and hydrogen electrodes. The hydrogen gas supplied in the aforementioned manner flows through the gas passage formed between the corrugated surface of the separator and the hydrogen electrode. The oxidizing gas flows through the gas passage formed between the corrugated surface of the separator and the oxygen electrode.

The hydrogen adsorbing alloy tank 300 contains a hydrogen adsorbing alloy (not shown). As the internal temperature of the hydrogen adsorbing alloy tank 300 decreases, the internal pressure thereof also decreases accordingly. As a result, the hydrogen adsorbing alloy becomes more likely to adsorb the hydrogen gas. On the other hand, as the internal temperature increases, the internal pressure also increases accordingly. Therefore, the hydrogen adsorbing alloy becomes more likely to discharge the adsorbed hydrogen gas. The hydrogen adsorbing alloy adsorbs hydrogen gas with an exothermic reaction, and discharges the adsorbed hydrogen gas via an endothermic reaction. In other words, the hydrogen adsorbing alloy adsorbs hydrogen gas with generation of heat, and discharges the adsorbed hydrogen gas with absorption of heat. Accordingly, in order to adsorb the hydrogen gas in the hydrogen adsorbing alloy tank 300, the hydrogen adsorbing alloy tank 300 is cooled with a heat exchange system described below. On the other hand, in order to discharge the adsorbed hydrogen gas from the hydrogen adsorbing alloy tank 300, the hydrogen adsorbing alloy tank 300 is heated with the heat exchange system.

As shown in FIG. 1, the fuel cell system of this embodiment further includes a hydrogen gas passage for allowing the hydrogen gas to flow within the system, an oxidizing gas passage 64 for allowing the oxidizing gas to flow within the system, a heat exchange system for controlling the temperature of the fuel cell 200 and the hydrogen adsorbing alloy tank 300 by circulating the cooling water, and a control unit 400.

The hydrogen gas passage includes a main passage 50 and a branch passage 54. The main passage 50 extends from a discharge port of the high-pressure hydrogen tank 100 through a branch point 52 to a supply port of the fuel cell 200. The branch passage 54 connects supply and discharge ports of the hydrogen adsorbing alloy tank 300 to the branch point 52.

The main passage 50 has a shut valve 10 and a regulator 12 between the discharge port of the high-pressure hydrogen tank 100 and the branch point 52. The main passage 50 further has a regulator 14 and a shut valve 16 between the branch point 52 and the supply port of the fuel cell 200. The branch passage 54 has a shut valve 18 and a pressure sensor 20. The pressure sensor 20 is a sensor for mainly detecting a pressure Ph of the hydrogen gas discharged from the hydrogen adsorbing alloy tank 300.

The heat exchange system includes a water pump 22, a radiator 500, and a cooling water passage. The cooling water passage includes a main passage 58 connecting the fuel cell 200 to the radiator 500, a branch passage 60 branching from the main passage 58 to the hydrogen adsorbing alloy tank 300, and a bypass passage 62 bypassing the radiator 500. Antifreeze cooling liquid flows through the cooling water passage.

In addition to the water pump 22, the main passage 58 has a water temperature sensor 28 and a bypass valve 26. The water temperature sensor 28 is a sensor for detecting a temperature Tw of the cooling water discharged from the fuel cell 200. The cooling water has almost the same temperature as does the fuel cell 200 right after it is discharged from the fuel cell 200. Therefore, the temperature Tw detected by the water temperature sensor 28 can be regarded as the temperature of the fuel cell 200.

The branch passage 60 has a regulating valve 24. The regulating valve 24 is capable of opening and closing, and also capable of varying the opening amount thereof to regulate the flow rate of the cooling water flowing into the hydrogen adsorbing alloy tank 300.

The bypass passage 62 is connected to the bypass valve 26 at its one end. The bypass valve 26 has three modes. In the first mode, the bypass valve 26 connects path a to path b (i.e., the cooling water is allowed to flow into the radiator 500). In the second mode, the bypass valve 26 connects path c to path b (i.e., the cooling water is allowed to flow into the bypass passage 62). In the third mode, the bypass valve 26 connects neither path a nor path c to path b (i.e., no cooling water is allowed to flow into the radiator 500 and the bypass passage 62).

The control unit 400 receives the detection result from the pressure sensor 20 and the water temperature sensor 28, and controls the valves 10 to 18, 24, 26 and the water pump 22. Note that illustration of control lines and the like is omitted for simplicity.

In this embodiment, the high-pressure hydrogen tank 100 corresponds to a hydrogen tank of the invention, the fuel cell 200 corresponds to a fuel cell of the invention, the hydrogen adsorbing alloy tank 300 corresponds to a hydrogen adsorbing alloy tank of the invention, the heat exchange system corresponds to a heat exchange unit of the invention, and the cooling water corresponds to a heat exchange medium of the invention.

Heating Operation and Normal Operation

Figure 2:
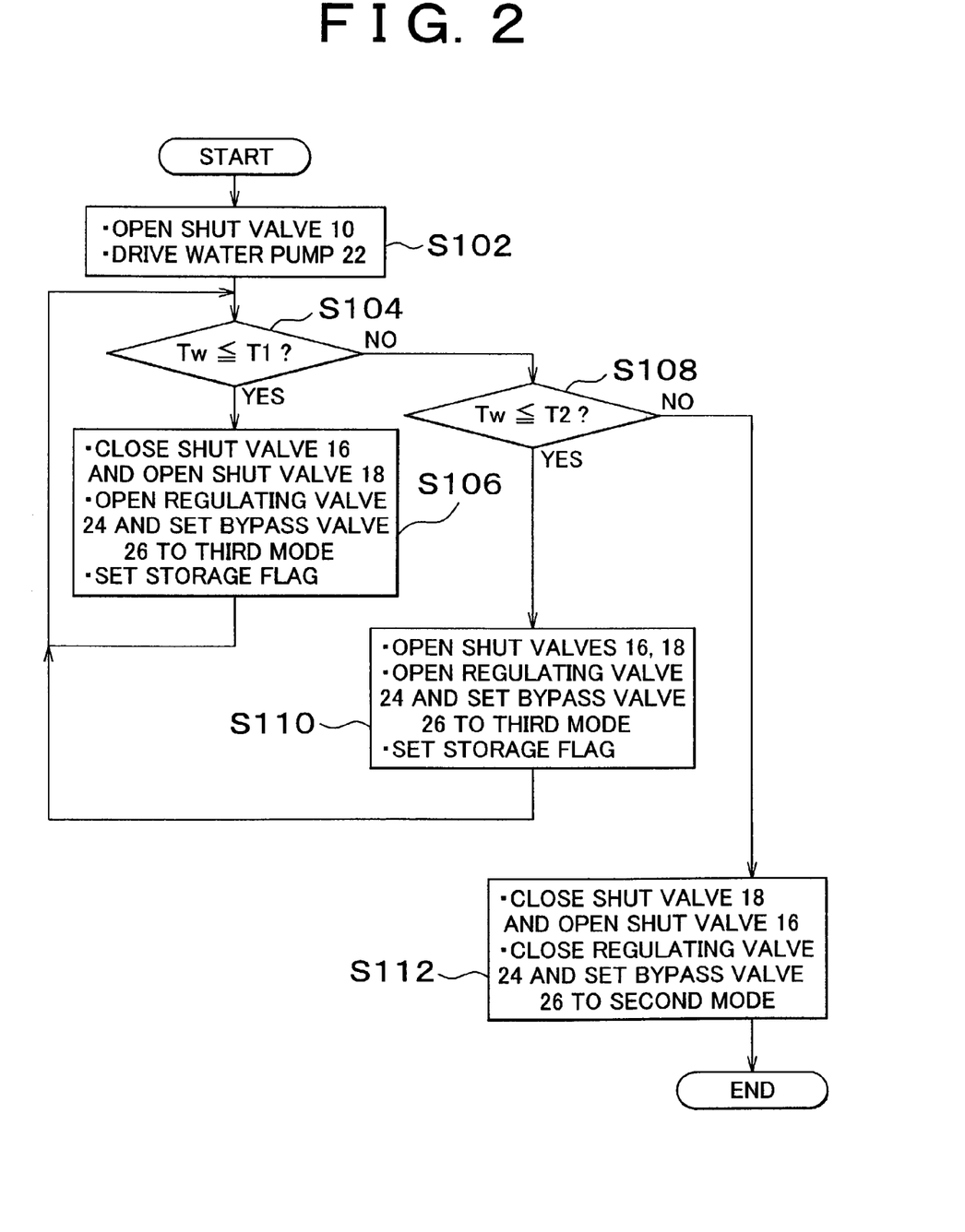
FIG. 2 is a flowchart illustrating starting operation in the fuel cell system of FIG. 1.

Hereinafter, starting operation of the fuel cell system of this embodiment will be described with reference to FIG. 2. FIG. 2 is a flowchart illustrating starting operation of the fuel cell system in FIG. 1.

Before the fuel cell system is started, every shut valve 10, 16, 18 in the hydrogen gas passage is closed. In the cooling water passage, the regulating valve 24 is closed, the bypass valve 26 is in the second mode, and the water pump 22 is stopped. The hydrogen adsorbing alloy tank 300 is empty, i.e., has adsorbed no hydrogen gas therein.

When the fuel cell system is started, the control unit 400 first opens the shut valve 10 in the main passage 50 of the hydrogen gas passage, and drives the water pump 22 in the cooling water passage (step S102). As the shut valve 10 is opened, the hydrogen gas is discharged from the high-pressure hydrogen tank 100 into the main passage 50. The water pump 22 thus driven allows the cooling water to flow.

The control unit 400 then receives the detection result from the water temperature sensor 28, and determines whether the temperature Tw of the cooling water is equal to or lower than a first reference temperature T1 or not (step S104). For example, the first reference temperature T1 is about 0° C., a melting point of the ice.

If the temperature Tw is equal to or lower than the first reference temperature T1, the fuel cell 200 has such a low temperature that it may possibly be frozen. Therefore, a first heating operation is started.

More specifically, the control unit 400 closes the shut valve 16 in the main passage 50 of the hydrogen gas passage and opens the shut valve 18 in the branch passage 54 thereof. In addition, the control unit 400 opens the regulating valve 24 in the branch passage 50 of the cooling water passage and sets the bypass valve 26 to the third mode. Moreover, the control unit 400 sets a storage flag described below (step S106).

As the shut valve 16 of the main passage 50 is closed and the shut valve 18 of the branch passage 54 is opened in step S106, the hydrogen gas discharged from the high-pressure hydrogen tank 100 into the main passage 50 is supplied to the hydrogen adsorbing alloy tank 300 through the branch point 52 and the branch passage 54, as shown by arrow h1 in the figure.

Note that a primary decompression regulator 12 is provided in the main passage 50. The high-pressure hydrogen gas (about 20 to 35 MPa) discharged from the high-pressure hydrogen tank 100 is decompressed to about 0.8 to 1 MPa by the regulator 12. The hydrogen gas thus decompressed is supplied to the hydrogen adsorbing alloy tank 300.

As described before, the hydrogen adsorbing alloy tank 300 is empty (i.e., adsorbs no hydrogen gas therein). Moreover, since the temperature of the cooling water is not higher than the first reference temperature T1, the ambient temperature and the temperature of the hydrogen adsorbing alloy tank 300 are also low. The hydrogen adsorbing alloy tank 300 therefore has an extremely low internal pressure.

As the hydrogen gas of about 0.8 to 1 MPa is supplied to the hydrogen adsorbing alloy tank 300, it is quickly adsorbed by the hydrogen adsorbing alloy in the hydrogen adsorbing alloy tank 300 due to its extremely low internal pressure. As described before, the hydrogen adsorbing alloys adsorb the hydrogen gas so as to generate heat by an exothermic reaction.

As the regulating valve 24 of the branch passage 60 is opened and the bypass valve 26 is set to the third mode in step S106, the cooling water circulates in the heat exchange system as shown by arrow w3. More specifically, after leaving the fuel cell 200, the cooling water flows through the main passage 58, the branch passage 60, the hydrogen adsorbing alloy tank 300, the branch passage 60, the main passage 58, and then back to the fuel cell 200.

The heat generated in the hydrogen adsorbing alloy tank 300 is thus transmitted from the hydrogen adsorbing alloy tank 300 to the fuel cell 200 by the circulating cooling water. As a result, the fuel cell 200 is heated.

As has been described above, upon starting of the fuel cell system of this embodiment, the fuel cell 200 can be heated with the heat generated by the hydrogen adsorbing alloy tank 300. More specifically, the hydrogen gas discharged from the high-pressure hydrogen tank 100 is supplied to the hydrogen adsorbing alloy tank 300 so as to be adsorbed therein. As a result, heat is generated in the hydrogen adsorbing alloy tank 300. The heat thus generated is transmitted to the fuel cell 200 by the heat exchange system, thereby heating the fuel cell 200.

The circulating cooling water is herein used to transmit heat from the hydrogen adsorbing alloy tank 300 to the fuel cell 200. In this case, when the cooling water itself has a low temperature, it must be heated with the heat generated in the hydrogen adsorbing alloy tank 300. According to the fuel cell system of this embodiment, the bypass valve 26 in the heat exchange system is set to the third mode. Therefore, the cooling water circulates merely in the path shown by arrow w3, and will not flow into the bypass passage 62 and the radiator 500. Since the cooling water circulates in the minimum length path, the amount of circulating cooling water is minimized. Accordingly, the cooling water can be heated quickly with a small heat quantity. As a result, the fuel cell 200 can be heated more quickly with a reduced amount of energy.

In step S106, the hydrogen gas is thus supplied from the high-pressure hydrogen tank 100 to the hydrogen adsorbing alloy tank 300 and adsorbed therein. The control unit 400 therefore sets a storage flag indicating that the hydrogen gas is adsorbed in the hydrogen adsorbing alloy tank 300, as described above.

After step S106, the routine returns to step S104.

If the temperature Tw of the cooling water is higher than the first reference temperature T1 in step S104, the fuel cell 200 is not in a frozen state. Therefore, the control unit 400 then determines whether the temperature Tw of the cooling water is equal to or lower than a second reference temperature T2 or not (step S108), where T2>T1. For example, the second reference temperature T2 is about 30 to 50° C.

It is now determined that the temperature Tw of the cooling water is not higher than the second reference temperature T2 in step S108. Since the temperature Tw of the cooling water is higher than the first reference temperature T1, the fuel cell 200 is not in the frozen state and is operable. However, since the temperature of the fuel cell 200 is not high enough for efficient operation, a second heating operation is started.

More specifically, the control unit 400 opens both the shut valve 16 in the main passage 50 of the hydrogen gas passage and the shut valve 18 in the branch passage 54 thereof. In addition, the control unit 400 opens the regulating valve 24 in the branch passage 60 of the cooling water passage and sets the bypass valve 26 to the third mode. If no storage flag is ON, the control unit 400 sets a storage flag (step S110).

As the shut valve 16 of the main passage 50 and the shut valve 18 of the branch passage 54 are both opened, the hydrogen gas discharged from the high-pressure hydrogen tank 100 into the main passage 50 is supplied as shown by arrows h1, h2. More specifically, a part of the hydrogen gas is supplied to the fuel cell 200 through the main passage 50, and the remaining hydrogen gas is supplied to the hydrogen adsorbing alloy tank 300 through the branch point 52 and the branch passage 54.

In addition to the primary decompression regulator 12, a secondary decompression regulator 14 is provided in the main passage 50. The hydrogen gas flowing through the main passage 50 toward the fuel cell 200 is first decompressed to about 0.8 to 1 MPa by the primary decompression regulator 12, and then to about 0.2 to 0.3 MPa by the secondary decompression regulator 14. As a result, the hydrogen gas of about 0.2 to 0.3 MPa is supplied to the fuel cell 200. Such two-stage decompression prevents the high-pressure hydrogen gas discharged from the high-pressure hydrogen tank 100 from being directly supplied to the fuel cell 200.

The oxidizing gas is also supplied to the fuel cell 200 through the oxidizing gas passage 64.

As the hydrogen gas and the oxidizing gas are supplied to the fuel cell 200, an electrochemical reaction occurs at the hydrogen electrode and the oxygen electrode of the fuel cell 200, whereby power is generated, as described above. Note that, since this electrochemical reaction is an exothermic reaction, the fuel cell 200 is heated by the electrochemical reaction.

As described above, the hydrogen gas supplied to the hydrogen adsorbing alloy tank 300 is adsorbed by the hydrogen adsorbing alloy contained therein with an exothermic reaction. The heat thus generated by the exothermic reaction is transmitted to the fuel cell 200 by the cooling water circulating in the heat exchange system, whereby the fuel cell 200 is further heated.

According to the fuel cell system of this embodiment, when the fuel cell 200 is not frozen but the temperature thereof is not high enough, the fuel cell 200 can be operated while being heated by using the hydrogen adsorbing alloy tank 300. The fuel cell 200 is thus heated with both the heat generated in the hydrogen adsorbing alloy tank 300 and the heat generated by the fuel cell 200 itself. As a result, the fuel cell 200 can be heated rapidly.

After step S110, the routine returns to step S104.

If the temperature Tw of the cooling water is higher than the second reference temperature T2 in step S108, the temperature of the fuel cell 200 is high enough for efficient operation. Accordingly, normal operation is started.

More specifically, the control unit 400 closes the shut valve 18 in the branch passage 54 of the hydrogen gas passage and opens the shut valve 16 in the main passage 50 thereof. In addition, the control unit 400 closes the regulating valve 24 in the branch passage 60 of the cooling water passage, and sets the bypass valve 26 to the second mode (step S112).

As the shut valve 18 of the branch passage 54 is closed and the shut valve 16 of the main passage 50 is opened, the hydrogen gas discharged from the high-pressure hydrogen tank 100 into the main passage 50 is supplied to the fuel cell 200 through the main passage 50, as shown by arrow h2.

The oxidizing gas is also supplied to the fuel cell 200 through the oxidizing gas passage 64.

As the hydrogen gas and the oxidizing gas are supplied to the fuel cell 200, an electrochemical reaction occurs at the hydrogen electrode and the oxygen electrode of the fuel cell 200, whereby power is generated, as described above. Since this electrochemical reaction is an exothermic reaction, the fuel cell 200 is heated by the electrochemical reaction.

As the regulating valve 24 of the branch passage 60 is closed and the bypass valve 26 is set to the second mode, the cooling water circulates in the heat exchange system as shown by arrow w2. More specifically, after leaving the fuel cell 200, the cooling water flows through the main passage 58, the bypass passage 62, the main passage 58, and then back to the fuel cell 200. This is because the temperature Tw of the cooling water would not be raised if the cooling water is circulated to the radiator 500 while the temperature Tw is lower than a steady temperature.

The control unit 400 keeps monitoring the temperature Tw of the cooling water by the water temperature sensor 28. When the temperature Tw of the cooling water reaches the steady temperature with the temperature rise in the fuel cell 200, the control unit 400 switches the bypass valve 26 from the second mode to the first mode. As a result, the cooling water circulates in the heat exchange system as shown by arrow w1. More specifically, after leaving the fuel cell 200, the cooling water flows through the main passage 58, the radiator 500, the main passage 58 and then back to the fuel cell 200. The cooling water thus heated by the fuel cell 200 is cooled in the radiator 500, whereby the temperature Tw of the cooling water and thus the temperature of the fuel cell 200 can be held at the steady temperature.

A series of steps in the starting operation shown in FIG. 2 is thus completed.

Regenerating Operation

Figure 3:
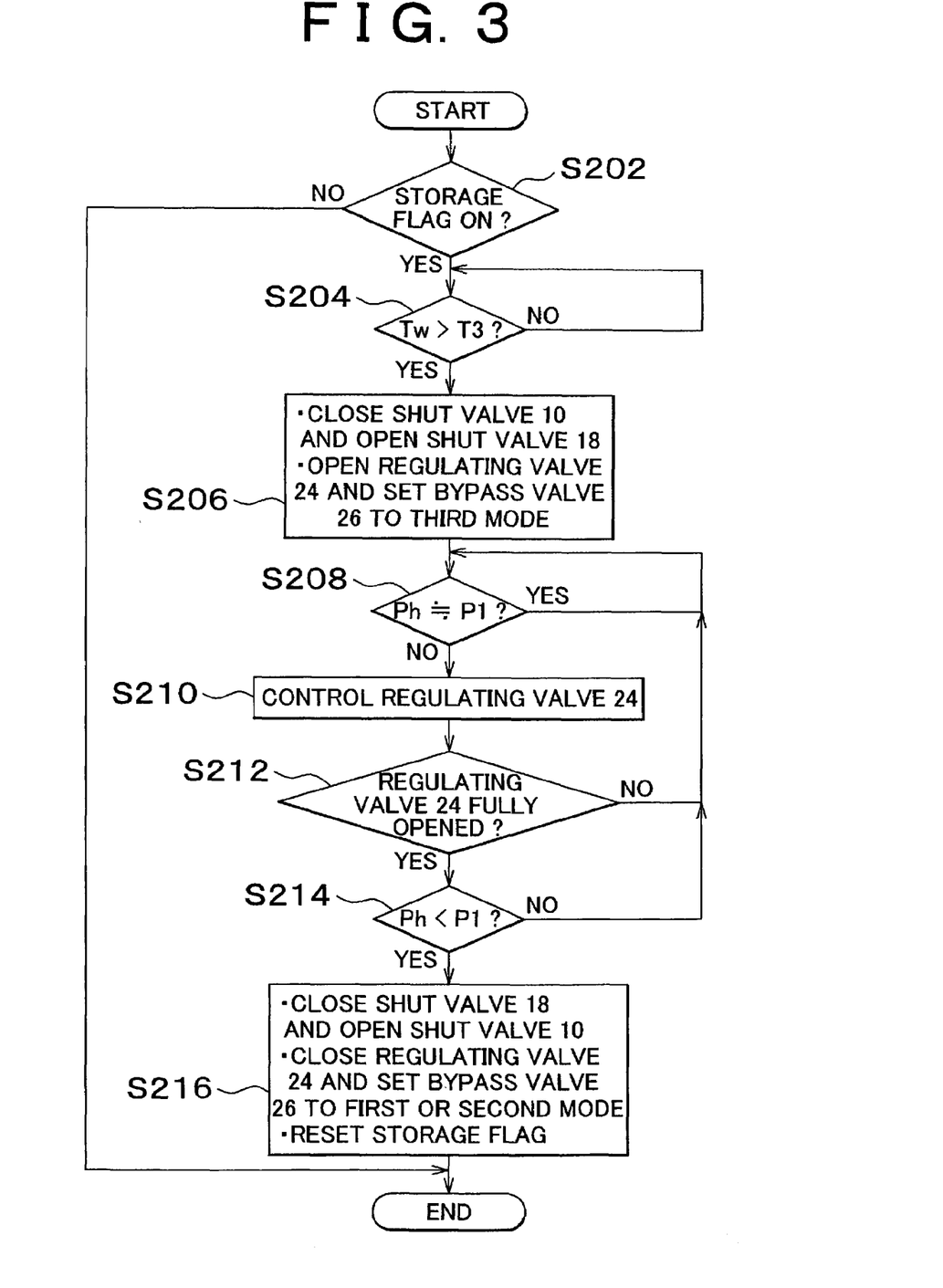
FIG. 3 is a flowchart illustrating regenerating operation in the fuel cell system of FIG. 1.

Hereinafter, regenerating operation in the fuel cell system of this embodiment will be described with reference to FIG. 3. The regenerating operation is conducted to reuse in the fuel cell 200 the hydrogen gas adsorbed in the hydrogen adsorbing alloy tank 300. FIG. 3 is a flowchart illustrating the regenerating operation in the fuel cell system of FIG. 1.

As described before, in normal operation, the shut valves 10, 16 in the main passage 50 of the hydrogen gas passage are opened, but the shut valve 18 in the branch passage 54 thereof is closed. Moreover, the regulating valve 24 in the branch passage 60 of the cooling water passage is closed and the bypass valve 26 is in the first or second mode.

When the regenerating operation of FIG. 3 is started during normal operation, the control unit 400 first determines whether a storage flag indicating that the hydrogen gas is adsorbed in the hydrogen adsorbing alloy tank 300 is ON or not (step S202). If the storage flag is OFF, no hydrogen gas is adsorbed in the hydrogen adsorbing alloy tank 300. In other words, the hydrogen adsorbing alloy tank 300 is empty. Therefore, the regenerating operation in FIG. 3 is terminated.

If the storage flag is ON, the hydrogen gas is adsorbed in the hydrogen adsorbing alloy tank 300. Therefore, the regenerating operation of FIG. 3 is continued.

The control unit 400 then receives the detection result from the water temperature sensor 28, and determines whether the temperature Tw of the cooling water is higher than a third reference temperature T3 or not (step S204), where T3>T2. For example, the third reference temperature T3 is about 50 to 80° C. If the temperature Tw of the cooling water is equal to or lower than the third reference temperature T3, the control unit 400 waits until the temperature Tw of the cooling water exceeds the third reference temperature T3. When the temperature Tw of the cooling water exceeds the third reference temperature T3, the control unit 400 closes the shut valve 10 in the main passage 50 of the hydrogen gas passage and opens the shut valve 18 in the branch passage 54 thereof. Moreover, the control unit 400 opens the regulating valve 24 in the branch passage 60 of the cooling water passage and sets the bypass valve 26 to the third mode (step S206). As the regulating valve 24 of the branch passage 60 is opened and the bypass valve 26 is set to the third mode in step S206, the cooling water circulates in the heat exchange system as shown by arrow w3. More specifically, after leaving the fuel cell 200, the cooling water flows through the main passage 58, the branch passage 60, the hydrogen adsorbing alloy tank 300, the branch passage 60, the main passage 58, and then back to the fuel cell 200.

Since the temperature Tw of the cooling water exceeds the third reference temperature T3 and the heat generated by the electrochemical reaction in the fuel cell 200 is transmitted from the fuel cell 200 to the hydrogen adsorbing alloy tank 300 by the circulating cooling water, the hydrogen adsorbing alloy tank 300 is heated to a higher temperature. As a result, the internal pressure of the hydrogen adsorbing alloy tank 300 is raised, whereby the hydrogen adsorbing alloy discharges the hydrogen gas adsorbed therein.

As described above, the shut valve 10 in the main passage 50 of the hydrogen gas passage is closed and the shut valve 18 in the branch passage 54 thereof is opened. Therefore, the hydrogen adsorbing alloy tank 300 discharges the hydrogen gas adsorbed therein to the outside. The hydrogen gas thus discharged is supplied to the fuel cell 200 through the branch passage 54, the branch point 52 and the main passage 50, as shown by arrow h3. The fuel cell 200 uses the received hydrogen gas for power generation.

The control unit 400 then receives the detection result from the pressure sensor 20, and determines whether the pressure Ph of the hydrogen gas discharged from the hydrogen adsorbing alloy tank 300 is nearly equal to a first reference pressure P1 or not (step S208). For example, the first reference pressure P1 is about 0.8 to 0.9 MPa.

If the pressure Ph of the hydrogen gas has not reached the first reference pressure P1 in step S208, the control unit 400 operates so that the pressure Ph reaches the first reference pressure P1. More specifically, the control unit 400 varies the opening amount of the regulating valve 24 in the cooling water passage to adjust the flow rate of the cooling water flowing into the hydrogen adsorbing alloy tank 300. The pressure Ph of the hydrogen gas is thus always held at the first reference pressure P1 while the hydrogen gas is being discharged from the hydrogen adsorbing alloy tank 300.

The pressure Ph of the hydrogen gas discharged from the hydrogen adsorbing alloy tank 300 is reduced over time. When the pressure Ph of the hydrogen gas can no longer be held at the first reference pressure P1 even by opening the regulating valve 24 to the maximum (step S212, S214), the control unit 400 determines that the hydrogen adsorbing alloy tank 300 has entirely discharged the hydrogen gas adsorbed therein, that is, the hydrogen adsorbing alloy tank 300 has become empty.

The control unit 400 then closes the shut valve 18 in the branch passage 54 of the hydrogen gas passage, and opens the shut valve 10 in the main passage 50 thereof. Moreover, the control unit 400 closes the regulating valve 24 in the branch passage 60 of the cooling water passage, and sets the bypass valve 26 to the first or second mode (step S216). The control unit 400 then resets the storage flag, which indicates that the hydrogen adsorbing alloy tank 300 becomes empty (step S216).

A series of steps in the regenerating operations in FIG. 3 is thus completed, and operation returns to the normal operation.

According to the fuel cell system of this embodiment, the hydrogen gas that was used to raise the temperature of the fuel cell 200 upon starting (i.e., the hydrogen gas that was supplied from the high-pressure hydrogen tank 100 to the hydrogen adsorbing alloy tank 300 and adsorbed therein) can be reused for power generation in the fuel cell 200 during operation thereof. This allows for efficient use of the energy of the hydrogen gas as a fuel.

The heat generated by the fuel cell is used to cause the hydrogen adsorbing alloy tank to discharge the hydrogen gas adsorbed therein. Therefore, no other source of energy is required.

The hydrogen adsorbing alloy tank 300 storing the hydrogen gas can be made empty during operation of the fuel cell 200. Therefore, the above heating operation can be started whenever the fuel cell system is restarted after operation of the fuel cell 200 is terminated.

The heat generated by the fuel cell 200 is used to make the hydrogen adsorbing alloy tank 300 storing the hydrogen gas empty. Therefore, no other source of energy is required.

Cooling Operation

In normal operation, the cooling water circulating in the fuel cell 200 is cooled in the radiator 500 and thus the temperature of the fuel cell 200 is held at a steady temperature when the bypass valve 26 of the cooling water passage is in the first mode, as described above. When a vehicle mounted with such a fuel cell system is used in, e.g., summer, however, such cooling with the radiator 500 may not be enough to hold the temperature of the fuel cell 200 at the steady temperature.

Figure 4:
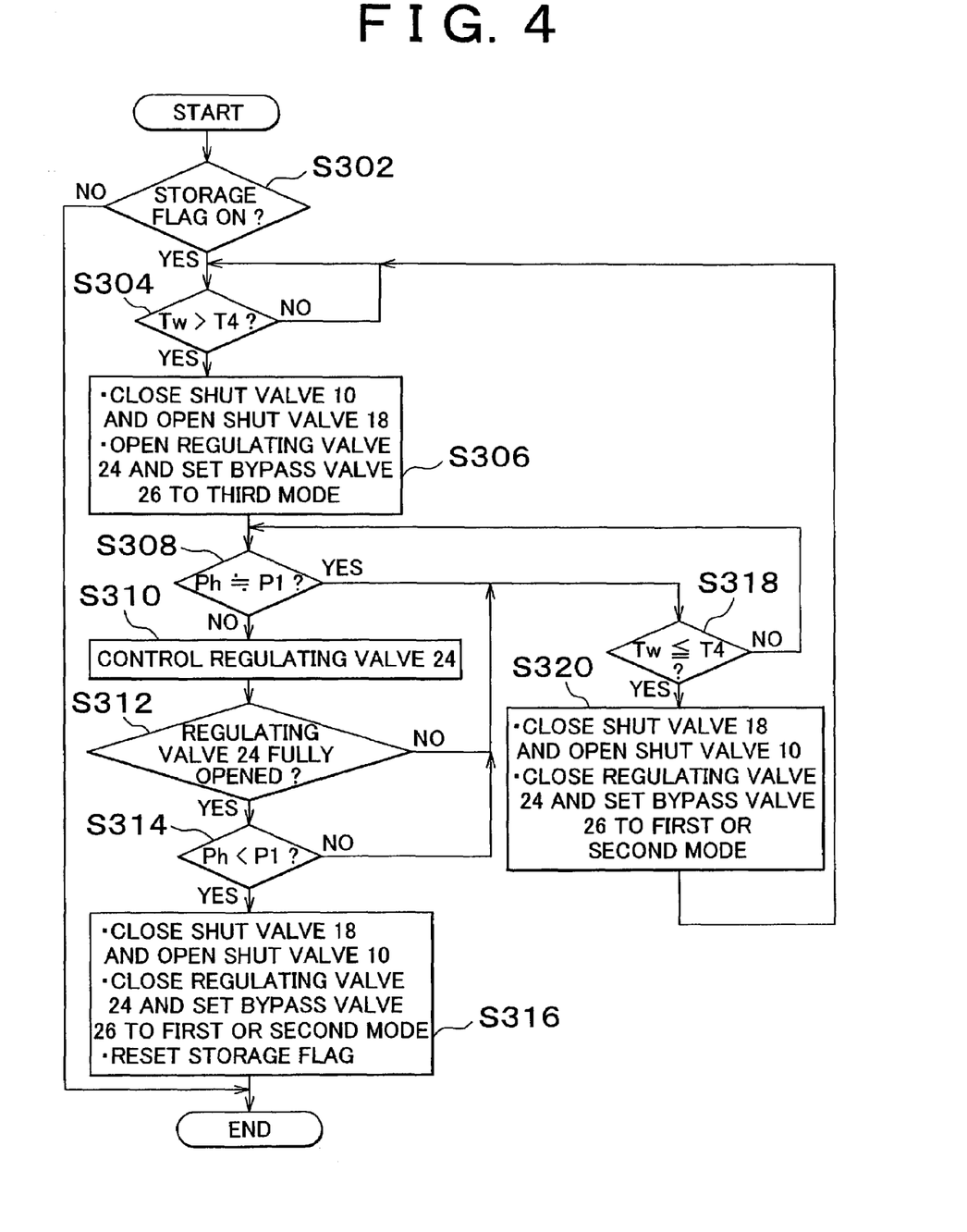
FIG. 4 is a flowchart illustrating cooling operation in the fuel cell system of FIG. 1.

Hereinafter, a cooling operation for cooling the fuel cell 200 by using the hydrogen adsorbing alloy tank 300 in the fuel cell system of this embodiment, which may be applied as an alternative to the Regenerating Operation C, will be described with reference to FIG. 4. FIG. 4 is a flowchart illustrating cooling operation in the fuel cell system of FIG. 1.

Note that this cooling operation is conducted instead of the regenerating operation described above. Since the cooling operation is basically the same as the regenerating operation, only the differences therebetween will be specifically described below.

When the cooling operation in FIG. 4 is started in normal operation, the control unit 400 first determines whether a storage flag indicating that the hydrogen gas is adsorbed in the hydrogen adsorbing alloy tank 300 is ON or not (step S302). If the storage flag is OFF, the hydrogen storage alloy tank 300 is empty and therefore the cooling operation using the hydrogen adsorbing alloy tank 300 cannot be conducted. Accordingly, the cooling operation in FIG. 4 is terminated.

If the storage flag is ON, the hydrogen gas is adsorbed in the hydrogen adsorbing alloy tank 300. Therefore, the cooling operation in FIG. 4 is continued.

The control unit 400 then receives the detection result from the water temperature sensor 28, and determines whether the temperature Tw of the cooling water is higher than a fourth reference temperature T4 or not (step S304), where T4>T2. For example, the fourth reference temperature T4 is about 80° C. or higher.

If the temperature Tw of the cooling water is equal to or lower than the fourth reference temperature T4, the control unit 400 waits until the temperature Tw of the cooling water exceeds the fourth reference temperature T4. When the temperature Tw of the cooling water exceeds the fourth reference temperature T4, the control unit 400 closes the shut valve 10 in the main passage 50 of the hydrogen gas passage and opens the shut valve 18 in the branch passage 54 thereof. Moreover, the control unit 400 opens the regulating valve 24 in the branch passage 60 of the cooling water passage and sets the bypass valve 26 to the third mode (step S306).

As the regulating valve 24 of the branch passage 60 is opened and the bypass valve 26 is set to the third mode in step S306, the cooling water circulates in the heat exchange system as shown by arrow w3. More specifically, after leaving the fuel cell 200, the cooling water flows through the main passage 58, the branch passage 60, the hydrogen adsorbing alloy tank 300, the branch passage 60, the main passage 58, and then back to the fuel cell 200.

The heat generated by the electrochemical reaction in the fuel cell 200 is thus transmitted from the fuel cell 200 to the hydrogen adsorbing alloy tank 300 by the circulating cooling water. The hydrogen adsorbing alloy tank 300 is thus heated by the heat transmitted thereto, and the internal pressure thereof is increased accordingly. As a result, the hydrogen adsorbing alloy discharges the hydrogen gas with an endothermic reaction. Since the hydrogen adsorbing alloy discharges the hydrogen gas while absorbing the heat, the cooling water leaving the hydrogen adsorbing alloy tank 300 has a reduced temperature. Accordingly, the cooling water having a reduced temperature is returned to the fuel cell 200, whereby the fuel cell 200 is cooled.

As described above, the shut valve 10 in the main passage 50 of the hydrogen gas passage is closed, and the shut valve 18 in the branch passage 54 thereof is opened. Therefore, the hydrogen adsorbing alloy tank 300 discharges the hydrogen gas adsorbed therein to the outside. The hydrogen gas thus discharged is supplied to the fuel cell 200 through the branch passage 54, the branch point 52 and the main passage 50, as shown by arrow h3. The fuel cell 200 uses the received hydrogen gas for power generation.

Since steps S308 to S314 are the same as steps S208 to S216 in FIG. 3, description thereof is omitted.

Thereafter, the control unit 400 again receives the detection result from the water temperature sensor 28 and determines whether or not the temperature Tw of the cooling water is equal to or lower than the fourth reference temperature T4 (step S318).

If the temperature Tw of the cooling water is higher than the fourth reference temperature T4, steps S308 to S314 are repeated until the temperature Tw becomes equal to or lower than the fourth reference temperature T4. When the temperature Tw of the cooling water becomes equal to or lower than the fourth reference temperature T4, the control unit 400 closes the shut valve 18 in the branch passage 54 of the hydrogen gas passage and opens the shut valve 10 in the main passage 50 thereof. Moreover, the control unit 400 closes the regulating valve 24 in the branch passage 60 of the cooling water passage and sets the bypass valve 26 to the first or second mode (step S320).

Note that while steps S308 to S314 are repeated, the pressure Ph of the hydrogen gas discharged from the hydrogen adsorbing alloy tank 300 is held at the first reference pressure P1, and the hydrogen adsorbing alloy tank 300 is not empty. Therefore, even when the shut valve 18 of the branch passage 54 is closed in step S320, the hydrogen gas still remains in the hydrogen adsorbing alloy tank 300.

As long as the hydrogen gas remains in the hydrogen adsorbing alloy tank 300, it is possible to cool the fuel cell 200 by using the hydrogen adsorbing alloy tank 300. Therefore, the routine returns to step S304.

The above operation is repeated until the hydrogen adsorbing alloy tank 300 storing the hydrogen gas becomes empty. When the hydrogen adsorbing alloy tank 300 becomes empty, step S316 is conducted. Step S316 is the same as step S216 in FIG. 2.

A series of steps in the cooling operation of FIG. 4 is thus completed, and operation returns to the normal operation.

According to the fuel cell system of this embodiment, the fuel cell 200 having a high temperature is cooled by using the hydrogen adsorbing alloy tank 300 storing the hydrogen gas. The temperature of the fuel cell 200 can thus be retained at the steady temperature.

Modifications

It should be noted that the invention is not limited to the above embodiment, and can be embodied in various forms without departing from the subject matter of the invention.

According to the above embodiment, when the hydrogen gas is adsorbed in the hydrogen adsorbing alloy tank 300 upon starting of the fuel cell system, operation of the fuel cell 200 is completed after the hydrogen adsorbing alloy tank 300 is made empty by the regenerating operation. However, even when the hydrogen gas is adsorbed in the hydrogen adsorbing alloy tank 300 upon starting of the fuel cell system, operation of the fuel cell may be completed without making the hydrogen adsorbing alloy tank 300 empty as long as the hydrogen adsorbing alloy tank 300 still has a sufficient capacity for storing the hydrogen gas. In this case as well, the above heating operation can be started whenever the fuel cell system is restarted.

In the above embodiment, once proceeding to the normal operation, operation will not return to the heating operation. However, operation may return to the heating operation if the temperature of the fuel cell 200 falls.

In the above embodiment, the fuel cell 200 is cooled only with the hydrogen adsorbing alloy tank 300 in the cooling operation. More specifically, the fuel cell 200 is cooled by opening the regulating valve 24 of the branch passage 60 and setting the bypass valve 26 to the third mode in the heat exchange system so that the cooling water circulates as shown by arrow w3. However, the invention is not limited to this. For example, the fuel cell 200 may alternatively be cooled with the hydrogen adsorbing alloy tank 300 and the radiator 500. More specifically, the fuel cell 200 may be cooled by opening the regulating valve 24 and setting the bypass valve 26 to the first mode so that the cooling water circulates both in the hydrogen adsorbing alloy tank 300 and the radiator 500 as shown by arrows w1, w3.

What is claimed is:

1. A fuel cell system, comprising:
   a hydrogen tank;
   a fuel cell connected and adapted to receive hydrogen gas and generate electric power;
   a hydrogen adsorbing alloy tank having a hydrogen adsorbing alloy, the hydrogen adsorbing alloy tank being connected to receive the hydrogen gas from the hydrogen tank, and adapted to adsorb the received hydrogen gas in the hydrogen adsorbing alloy, and to discharge the hydrogen gas from the hydrogen adsorbing alloy to the fuel cell;
   a heat exchange unit connected and adapted to circulate a heat exchange medium to the fuel cell and the hydrogen adsorbing alloy tank, to cause heat exchange at least between the fuel cell and the hydrogen adsorbing alloy tank;
   a first passage connecting the hydrogen tank and the fuel cell, so as to allow hydrogen gas from the hydrogen tank to flow into the fuel cell;
   a second passage branching from the first passage and connecting the first passage and the hydrogen adsorbing alloy tank;
   a shut-off valve in the first fuel passage at a location downstream from a location where the second passage branches from the first passage;
   a control unit adapted such that when a temperature of the fuel cell is equal to or lower than a first reference temperature, the control unit heats the fuel cell by shutting the shut-off valve to supply the hydrogen gas from the hydrogen tank to the hydrogen adsorbing alloy tank through the first passage and the second passage so that the hydrogen gas is adsorbed in the hydrogen adsorbing alloy tank with generation of heat, and transmitting the generated heat to the fuel cell by the heat exchange medium in the heat exchange unit.

2. The fuel cell system according to claim 1, wherein the first reference temperature is about 0° C.

3. The fuel cell system according to claim 1, wherein the hydrogen adsorbing alloy is an alloy which is more likely to adsorb the hydrogen gas as an internal temperature of the hydrogen adsorbing alloy decreases, and is more likely to discharge the hydrogen gas as the internal temperature increases, and the hydrogen adsorbing alloy is an alloy which causes an exothermic reaction when storing the hydrogen gas, and causes an endothermic reaction when discharging the hydrogen gas adsorbed therein.

4. The fuel cell system according to claim 1, further comprising a shut-off valve in said second passage.

5. The fuel cell system according to claim 1, wherein said hydrogen tank is charged with high pressure hydrogen gas.

6. A fuel cell system, comprising:
   a hydrogen tank;
   a fuel cell connected and adapted to receive hydrogen gas and generate electric power;
   a hydrogen adsorbing alloy tank having a hydrogen adsorbing alloy, the hydrogen adsorbing alloy tank being connected to receive the hydrogen gas from the hydrogen tank, and adapted to adsorb the received hydrogen gas in the hydrogen adsorbing alloy, and to discharge the hydrogen gas from the hydrogen adsorbing alloy to the fuel cell;

a heat exchange unit connected and adapted to circulate a heat exchange medium to the fuel cell and the hydrogen adsorbing alloy tank, to cause heat exchange at least between the fuel cell and the hydrogen adsorbing alloy tank;

a first passage connecting the hydrogen tank and the fuel cell, so as to allow hydrogen gas from the hydrogen tank to flow into the fuel cell;

a second passage branching from the first passage and connecting the first passage and the hydrogen adsorbing alloy tank; and a control unit adapted such that when a temperature of the fuel cell is equal to or lower than a first reference temperature, the control unit heats the fuel cell by supplying the hydrogen gas from the hydrogen tank to the hydrogen adsorbing alloy tank through the first passage and the second passage so that the hydrogen gas is adsorbed in the hydrogen adsorbing alloy tank with generation of heat, and transmitting the generated heat to the fuel cell by the heat exchange medium in the heat exchange unit, wherein a circulation path of the heat exchange medium in the heat exchange unit is configured to minimize an amount of the heat exchange medium circulating in the fuel cell and the hydrogen adsorbing alloy tank.

7. A fuel cell system, comprising:

a hydrogen tank;

a fuel cell connected and adapted to receive hydrogen gas and generate electric power;

a hydrogen adsorbing alloy tank having a hydrogen adsorbing alloy, the hydrogen adsorbing alloy tank being connected to receive the hydrogen gas from the hydrogen tank, and adapted to adsorb the received hydrogen gas in the hydrogen adsorbing alloy, and to discharge the hydrogen gas from the hydrogen adsorbing alloy to the fuel cell;

a heat exchange unit connected and adapted to circulate a heat exchange medium to the fuel cell and the hydrogen adsorbing alloy tank, to cause heat exchange at least between the fuel cell and the hydrogen adsorbing alloy tank;

a first passage connecting the hydrogen tank and the fuel cell, so as to allow hydrogen gas from the hydrogen tank to flow into the fuel cell;

a second passage branching from the first passage and connecting the first passage and the hydrogen adsorbing alloy tank; and a control unit adapted such that when a temperature of the fuel cell is equal to or lower than a first reference temperature, the control unit heats the fuel cell by supplying the hydrogen gas from the hydrogen tank to the hydrogen adsorbing alloy tank through the first passage and the second passage so that the hydrogen gas is adsorbed in the hydrogen adsorbing alloy tank with generation of heat, and transmitting the generated heat to the fuel cell by the heat exchange medium in the heat exchange unit, wherein when the temperature of the fuel cell is higher than the first reference temperature and equal to or lower than a second reference temperature, the control unit is adapted to allow the fuel cell to use the hydrogen gas for power generation by supplying the hydrogen gas from the hydrogen tank to the fuel cell through the first passage, and heat the fuel cell by supplying the hydrogen gas from the hydrogen tank to the hydrogen adsorbing alloy tank through the first passage and the second passage so that the hydrogen gas is adsorbed in the hydrogen adsorbing alloy tank with generation of heat, and transmitting the generated heat to the fuel cell by the heat exchange medium in the heat exchange unit.

8. The fuel cell system according to claim 7, wherein the second reference temperature is about 30 to 50° C.

9. A fuel cell system, comprising:

a hydrogen tank;

a fuel cell connected and adapted to receive hydrogen gas and generate electric power;

a hydrogen adsorbing alloy tank having a hydrogen adsorbing alloy, the hydrogen adsorbing alloy tank being connected to receive the hydrogen gas from the hydrogen tank, and adapted to adsorb the received hydrogen gas in the hydrogen adsorbing alloy, and to discharge the hydrogen gas from the hydrogen adsorbing alloy to the fuel cell;

a heat exchange unit connected and adapted to circulate a heat exchange medium to the fuel cell and the hydrogen adsorbing alloy tank, to cause heat exchange at least between the fuel cell and the hydrogen adsorbing alloy tank;

a first passage connecting the hydrogen tank and the fuel cell, so as to allow hydrogen gas from the hydrogen tank to flow into the fuel cell;

a second passage branching from the first passage and connecting the first passage and the hydrogen adsorbing alloy tank; and a control unit adapted such that when a temperature of the fuel cell is equal to or lower than a first reference temperature, the control unit heats the fuel cell by supplying the hydrogen gas from the hydrogen tank to the hydrogen adsorbing alloy tank through the first passage and the second passage so that the hydrogen gas is adsorbed in the hydrogen adsorbing alloy tank with generation of heat, and transmitting the generated heat to the fuel cell by the heat exchange medium in the heat exchange unit, wherein when the temperature of the fuel cell is higher than a second reference temperature that is higher than the first reference temperature, the control unit is adapted to allow the fuel cell to use the hydrogen gas for power generation by transmitting heat generated by the fuel cell to the hydrogen adsorbing alloy tank by the heat exchange medium in the heat exchange unit so that the hydrogen adsorbing alloy tank discharges the hydrogen gas adsorbed therein, and supplying the discharged hydrogen gas to the fuel cell through the second passage and the first passage.

10. The fuel cell system according to claim 9, wherein the second reference temperature is about 50 to 80° C.

11. A fuel cell system, comprising:

a hydrogen tank;

a fuel cell connected and adapted to receive hydrogen gas and generate electric power;

a hydrogen adsorbing alloy tank having a hydrogen adsorbing alloy, the hydrogen adsorbing alloy tank being connected to receive the hydrogen gas from the hydrogen tank, and adapted to adsorb the received hydrogen gas in the hydrogen adsorbing alloy, and to discharge the hydrogen gas from the hydrogen adsorbing alloy to the fuel cell;

a heat exchange unit connected and adapted to circulate a heat exchange medium to the fuel cell and the hydrogen adsorbing alloy tank, to cause heat exchange at least between the fuel cell and the hydrogen adsorbing alloy tank;

a first passage connecting the hydrogen tank and the fuel cell, so as to allow hydrogen gas from the hydrogen tank to flow into the fuel cell;

a second passage branching from the first passage and connecting the first passage and the hydrogen adsorbing alloy tank; and a control unit adapted such that when a temperature of the fuel cell is equal to or lower than a first reference temperature, the control unit heats the fuel cell by supplying the hydrogen gas from the hydrogen tank to the hydrogen adsorbing alloy tank through the first passage and the second passage so that the hydrogen gas is adsorbed in the hydrogen adsorbing alloy tank with generation of heat, and transmitting the generated heat to the fuel cell by the heat exchange medium in the heat exchange unit, wherein, during operation of the fuel cell, the control unit is adapted to cut off supply of the hydrogen gas to the hydrogen adsorbing alloy tank and to discharge the hydrogen gas adsorbed by the hydrogen adsorbing alloy in order to ensure that the hydrogen adsorbing alloy tank has a capacity for storing the hydrogen gas when operation of the fuel cell is completed.

12. A fuel cell system, comprising:

a hydrogen tank;

a fuel cell connected and adapted to receive hydrogen gas and generate electric power;

a hydrogen adsorbing alloy tank having a hydrogen adsorbing alloy, the hydrogen adsorbing alloy tank being connected to receive the hydrogen gas from the hydrogen tank, and adapted to adsorb the received hydrogen gas in the hydrogen adsorbing alloy, and to discharge the hydrogen gas from the hydrogen adsorbing alloy to the fuel cell;

a heat exchange unit connected and adapted to circulate a heat exchange medium to the fuel cell and the hydrogen adsorbing alloy tank, to cause heat exchange at least between the fuel cell and the hydrogen adsorbing alloy tank;

a first passage connecting the hydrogen tank and the fuel cell, so as to allow hydrogen gas from the hydrogen tank to flow into the fuel cell;

a second passage branching from the first passage and connecting the first passage and the hydrogen adsorbing alloy tank; and a control unit adapted such that when a temperature of the fuel cell is equal to or lower than a first reference temperature, the control unit heats the fuel cell to supply the hydrogen gas from the hydrogen tank to the hydrogen adsorbing alloy tank through the first passage and the second passage so that the hydrogen gas is adsorbed in the hydrogen adsorbing alloy tank with generation of heat, and transmitting the generated heat to the fuel cell by the heat exchange medium in the heat exchange unit.

13. The fuel cell system according to claim 12, wherein said hydrogen tank is charged with high pressure hydrogen gas.

* * * * *